US010364353B2

(12) United States Patent
Morita et al.

(10) Patent No.: US 10,364,353 B2
(45) Date of Patent: Jul. 30, 2019

(54) SILICONE RUBBER COMPOSITION AND SILICONE RUBBER CROSSLINKED BODY

(71) Applicants: SUMITOMO RIKO COMPANY LIMITED, Komaki-shi, Aichi-ken (JP); SUMIRIKO FINE ELASTOMER, LTD., Ageo-shi, Saitama (JP)

(72) Inventors: Takahiro Morita, Komaki (JP); Yasunori Nimura, Komaki (JP); Ryosuke Yamaoka, Komaki (JP); Shigeru Fukagawa, Ageo (JP); Tomohito Seki, Ageo (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 0 days.

(21) Appl. No.: 15/924,653

(22) Filed: Mar. 19, 2018

(65) Prior Publication Data
US 2018/0208767 A1    Jul. 26, 2018

Related U.S. Application Data

(63) Continuation of application No. PCT/JP2017/012519, filed on Mar. 28, 2017.

(30) Foreign Application Priority Data

Mar. 29, 2016    (JP) .................. 2016-065046

(51) Int. Cl.
*C08G 77/08* (2006.01)
*C08L 83/04* (2006.01)
*C08K 9/10* (2006.01)
*C08G 77/06* (2006.01)
*C08G 77/12* (2006.01)
*C08G 77/20* (2006.01)

(52) U.S. Cl.
CPC .............. *C08L 83/04* (2013.01); *C08K 9/10* (2013.01); *C08G 77/06* (2013.01); *C08G 77/12* (2013.01); *C08G 77/20* (2013.01); *C08L 2312/00* (2013.01)

(58) Field of Classification Search
CPC .................................. C08K 9/10; C08K 77/08
USPC ............................................. 523/211; 528/15
See application file for complete search history.

(56) References Cited

U.S. PATENT DOCUMENTS

| | | | |
|---|---|---|---|
| 4,766,176 A | 8/1988 | Lee et al. | |
| 5,015,691 A | 5/1991 | Lewis et al. | |
| 5,017,654 A | 5/1991 | Togashi et al. | |
| 5,153,160 A | 10/1992 | Saruyama et al. | |
| 5,254,656 A | 10/1993 | Bilgrien et al. | |
| 5,443,873 A | 8/1995 | Itani et al. | |
| 5,668,225 A * | 9/1997 | Okazaki | C08K 9/10 523/211 |
| 5,725,922 A | 3/1998 | Nakamura et al. | |
| 5,789,334 A | 8/1998 | Nakanishi et al. | |
| 6,562,258 B1 | 5/2003 | Elsome et al. | |
| 2011/0257315 A1 | 10/2011 | Shiono et al. | |
| 2014/0356040 A1 | 12/2014 | Sakakibara et al. | |
| 2015/0212461 A1 | 7/2015 | Abe et al. | |

FOREIGN PATENT DOCUMENTS

| | | |
|---|---|---|
| EP | 0 363 006 A2 | 4/1990 |
| EP | 0 651 008 A1 | 5/1995 |
| JP | 62-89721 A | 4/1987 |
| JP | 64-45468 A | 2/1989 |
| JP | 2-14244 A | 1/1990 |
| JP | 2-117960 A | 5/1990 |
| JP | 3-68659 A | 3/1991 |
| JP | 3-139564 A | 6/1991 |
| JP | 3-220246 A | 9/1991 |
| JP | 4-23867 A | 1/1992 |
| JP | 4-53873 A | 2/1992 |
| JP | 4-53874 A | 2/1992 |
| JP | 6-157913 A | 6/1994 |
| JP | 7-118535 A | 5/1995 |
| JP | 9-67440 A | 3/1997 |
| JP | 9-244394 A | 9/1997 |
| JP | 2000-159896 A | 6/2000 |
| JP | 2002-12768 A | 1/2002 |
| JP | 2002-114860 A | 4/2002 |
| JP | 2004-70159 A | 3/2004 |
| JP | 3712380 B2 | 11/2005 |

(Continued)

OTHER PUBLICATIONS

International Search Report dated Feb. 28, 2017, issued in International Application No. PCT/JP2016/085317 (2 pages).
International Search Report dated Mar. 15, 2016, issued in International Application No. PCT/JP2015/077546 (2 pages).
International Preliminary Report on Patentability (Form PCT/IPEA/409) issued in International Application No. PCT/JP2015/077546 filed Sep. 29, 2015 (4 pages).
Written Opinion dated Mar. 15, 2016, issued in Application No. PCT/JP2015/077546, w/English translation (4 pages).
Reply dated Jul. 7, 2016, issued in Japanese Application No. PCT/JP2015/077546, w/English translation (10 pages).

(Continued)

*Primary Examiner* — Margaret G Moore
(74) *Attorney, Agent, or Firm* — Westerman, Hattori, Daniels & Adrian, LLP

(57) ABSTRACT

Provided are a silicone rubber composition that is excellent in storage stability and crosslinking reactivity, and a silicone rubber crosslinked body made from the silicone rubber composition. The silicone rubber composition contains (a) an organopolysiloxane, (b) a crosslinking agent, and (c) a microcapsule type catalyst that is made of microparticles of a resin and a crosslinking catalyst encapsulated in the microcapsules, wherein the solubility parameter of the resin of (c) is 7.9 or higher, a thermal conductivity of 0.16 W/m·K or higher, and a glasstransition temperature of 40 to 145 degrees C. The silicone rubber crosslinked body is made of a crosslinked product of the above-described silicone rubber composition.

12 Claims, No Drawings

(56) References Cited

FOREIGN PATENT DOCUMENTS

| JP | 2006-159819 A | 6/2006 |
| JP | 2008-129171 A | 6/2008 |
| JP | 2008-150552 A | 7/2008 |
| JP | 2009-210710 A | 9/2009 |

OTHER PUBLICATIONS

Non-Final Office Action dated Oct. 19, 2017, issued in U.S. Appl. No. 15/358,912 (19 pages).
International Search Report dated May 9, 2017, issued in International Application No. PCT/JP2017/012519 (2 pages).
English Abstract of JP4-29748 A; cited in U.S. Final Office Action dated May 11, 2018. (2 pages).
RN 91597-69-4 for polyvinylbutyral Scifinder 2018; cited in U.S. Final Office Action dated May 11, 2018. (5 pages).
Final Office Action dated May 11, 2018, issued in U.S. Appl. No. 15/358,912. (18 pages).
Notice of Allowance dated Jul. 18, 2018, issued in U.S. Appl. No. 15/902,213. (13 pages).

\* cited by examiner

SILICONE RUBBER COMPOSITION AND SILICONE RUBBER CROSSLINKED BODY

TECHNICAL FIELD

The present invention relates to a silicone rubber composition and a silicone rubber crosslinked body, and more particularly to a silicone rubber composition that is excellent in storage stability and crosslinking reactivity, and a silicone rubber crosslinked body made from the silicone rubber composition.

BACKGROUND ART

Patent Documents 1 and 2 describe using a thermosetting organic polymer composition containing a thermoplastic resin microparticulate catalyst that is made from thermoplastic microparticles containing of a resin and a crosslinking catalyst in order to secure storage stability of the composition before being cured.

CITATION LIST

Patent Literature

Patent Document 1: Patent JP2000-159896
Patent Document 2: Patent JPH09-67440

SUMMARY OF INVENTION

Problems to be Solved by the Invention

A composition prepared by blending a resin microparticulate catalyst with a mixture of an organopolysiloxane and a crosslinking agent cannot secure long-term storage stability in a mixed state at around room temperature depending on the type of the resin making up the resin microparticulate catalyst, so that problems of a significant increase in viscosity of the mixture and progress of curing of the mixture are caused. In addition, it takes a time to crosslink the mixture in curing the mixture by heating, so that the composition could have low crosslinking reactivity. Until now, there has not been a technique for obtaining a silicone rubber composition that has both of excellent storage stability in a mixed state and excellent crosslinking reactivity during heating.

An object of the present invention is to provide a silicone rubber composition that has excellent storage stability in a mixed state and excellent crosslinking reactivity during heating, and a silicone rubber crosslinked body made from the silicone rubber composition.

Means of Solving the Problems

To achieve the objects and in accordance with the purpose of the present invention, a silicone rubber composition according to one embodiment of the present invention contains (a) an organopolysiloxane, (b) a crosslinking agent, and (c) a microcapsule type catalyst that is made of microparticles of a resin and a crosslinking catalyst encapsulated in the microparticles. The solubility parameter of the resin of (c) is 7.9 or higher, a thermal conductivity of 0.16 W/m·K or higher, and a glasstransition temperature of 40 to 145 degrees C.

It is preferable that the resin of (c) should be at least one of an epoxy resin, an acrylic resin, a polyvinylbutyral resin, and a styrene-based polymer. It is preferable that the glasstransition temperature of the resin of (c) is within the range of 40 to 85 degrees C. It is preferable that the solubility parameter of the resin of (c) should be 8.3 or higher. It is preferable that the resin of (c) should contain an acrylic resin, and the acrylic resin should be a copolymer of an ethyl methacrylate and a methyl methacrylate. It is preferable that the resin of (c) should contain a styrene-based polymer, and the styrene-based polymer should be one of a copolymer of styrene and butadiene, and a copolymer of styrene and a maleic anhydride.

According to another embodiment of the present invention, a silicone rubber crosslinked body is made of a crosslinked product of the above-described silicone rubber composition.

Advantageous Effects of Invention

With the silicone rubber composition according to the embodiment of the present invention, since the resin of the microparticles of the resin and a crosslinking catalyst encapsulated in the microparticles has a solubility parameter of 7.9 or higher, a thermal conductivity of 0.16 W/m·K or higher, and a glasstransition temperature of 40 to 145 degrees C., the silicone rubber composition has excellent storage stability in a mixed state and excellent crosslinking reactivity during heating.

When the glasstransition temperature of the resin of (c) is within the range of 40 to 85 degrees C., the silicone rubber composition has excellent crosslinking reactivity at low temperature. When the solubility parameter of the resin of (c) is 8.3 or higher, the silicone rubber composition has improved storage stability in a mixed state. When the resin of (c) contains an acrylic resin, and the acrylic resin is a copolymer of an ethyl methacrylate and a methyl methacrylate, the silicone rubber composition has a low glasstransition temperature, and has excellent crosslinking reactivity during low-temperature heating. When the resin of (c) contains a styrene-based polymer, and the styrene-based polymer is one of a copolymer of styrene and butadiene, and a copolymer of styrene and a maleic anhydride, the silicone rubber composition has high thermal conductivity and excellent crosslinking reactivity during heating.

DESCRIPTION OF EMBODIMENTS

Hereinafter, a detailed description of the present invention will be provided.

A silicone rubber composition according to one embodiment of the present invention contains (a) an organopolysiloxane, (b) a crosslinking agent, and (c) a microcapsule type catalyst that is made of microparticles of a resin and a crosslinking catalyst encapsulated in the microparticles.

(a) The organopolysiloxane has at least two functional groups that are to be crosslinked by (b) the crosslinking agent, in one molecule. Examples of (a) the organopolysiloxane include an alkenyl group-containing organopolysiloxane, a hydroxyl group-containing organopolysiloxane, a (meth)acryl group-containing organopolysiloxane, an isocyanate-containing organopolysiloxane, an amino group-containing organopolysiloxane, and an epoxy group-containing organopolysiloxane. The alkenyl group-containing organopolysiloxane is used as a main material for an addition curing type silicone rubber composition. The alkenyl group-containing organopolysiloxane is crosslinked by a hydrosilyl crosslinking agent in addition reaction with the hydrosilyl crosslinking agent. While proceeding even at room temperature, this addition reaction is promoted under heating. Thermal curing by this addition reaction is normally performed at higher than 100 degrees C., and preferably at 100 to 170 degrees C. A platinum catalyst is preferably used as the hydrosilylation catalyst in this addition reaction. The alkenyl group-containing organopolysiloxane preferably has at least two alkenyl groups in one molecule.

The organopolysiloxane has an organic group. The organic group defines a monovalent substituted or unsubstituted hydrocarbon group. Examples of the unsubstituted hydrocarbon group include alkyl groups such as a methyl group, an ethyl group, a propyl group, a butyl group, a hexyl group, and a dodecyl group, aryl groups such as a phenyl group, and aralkyl groups such as a β-phenylethyl group and a β-phenylpropyl group. Examples of the substituted hydrocarbon group include a chloromethyl group and a 3,3,3-trifluoropropyl group. In general, organopolysiloxanes having a methyl group as the organic group are used from the viewpoint of easy synthesis. While organopolysiloxanes of a straight-chain type are preferable, branched organopolysiloxanes or circular organopolysiloxanes may be used. Examples of the alkenyl group include a vinyl group, an allyl group, a butenyl group, a pentenyl group, and a hexenyl group.

(b) The crosslinking agent defines a crosslinking agent for crosslinking (a) the organopolysiloxane. Examples of (b) the crosslinking agent include a hydrosilyl crosslinking agent, a sulfur crosslinking agent, and a peroxide crosslinking agent. The hydrosilyl crosslinking agent is used as a crosslinking agent for an addition curing type silicone rubber composition. The hydrosilyl crosslinking agent has a hydrosilyl group (SiH group) in its molecular structure. The hydrosilyl crosslinking agent defines a hydrosilyl group-containing organopolysiloxane (an organohydrogenpolysiloxane). The number of hydrosilyl groups in the molecular structure is not particularly limited: however, the number is preferably in the range of two to 50 from the viewpoint of being excellent in curing rate and stability. When the hydrosilyl crosslinking agent has two or more hydrosilyl groups in its molecular structure, the hydrosilyl groups are preferably present in different Si. The polysiloxane may be a chain polysiloxane or a circular polysiloxane. The hydrosilyl group-containing organopolysiloxane preferably has at least two hydrosilyl groups in one molecule. The number average molecular mass of the hydrosilyl crosslinking agent is preferably in the range of 200 to 30,000 from the viewpoint of being excellent in handling properties.

Specific examples of the hydrosilyl group-containing organopolysiloxane (organohydrogenpolysiloxane) include a methylhydrogenpolysiloxane with both terminals blocked with trimethylsiloxy groups, a dimethylsiloxane-methylhydrogensiloxane copolymer with both terminals blocked with trimethylsiloxy groups, a dimethylpolysiloxane with both terminals blocked with dimethylhydrogensiloxy groups, a dimethylsiloxane-methylhydrogensiloxane copolymer with both terminals blocked with dimethylhydrogensiloxy groups, a methylhydrogensiloxane-diphenylsiloxane copolymer with both terminals blocked with trimethylsiloxy groups, a methylhydrogensiloxane-diphenylsiloxane-dimethylsiloxane copolymer with both terminals blocked with trimethylsiloxy groups, a copolymer consisting of 1/2 unit of $(CH_3)_2HSiO$ and 4/2 units of $SiO$, and a copolymer consisting of 1/2 unit of $(CH_3)_2HSiO$, 4/2 units of $SiO$, and 3/2 units of $(C_6H_5)SiO$.

The content of (b) the crosslinking agent is not particularly limited; however, the content is normally in the range of 0.1 to 40 parts by mass with respect to 100 parts by mass of (a) the organopolysiloxane.

The crosslinking catalyst of (c) defines a catalyst for promoting the crosslinking reaction of (a) the organopolysiloxane by (b) the crosslinking agent. Examples of the crosslinking catalyst of (c) include a platinum catalyst as a hydrosilylation catalyst, a ruthenium catalyst, and a rhodium catalyst. Examples of the platinum catalyst include microparticulate platinum, platinum black, platinum carrying active carbon, platinum carrying silica, chloroplatinic acid, an alcohol solution of chloroplatinic acid, an olefin complex of platinum, and an alkenyl siloxane complex of platinum. Among them, a single kind of crosslinking catalyst may be used alone, or two or more kinds of crosslinking catalysts may be used in combination.

The resin of (c) is for microcapsulating the crosslinking catalyst of (c), and the crosslinking catalyst of (c) is encapsulated by the resin of (c). The resin that encapsulates the crosslinking catalyst is microparticulate. Microparticles are solid at least at room temperature, and have an average particle diameter of 30 μm or smaller. The average particle diameter is measured with the use of a laser microscope. The average particle diameter of the microparticles of the resin of (c) is preferably 10 μm or smaller, and more preferably 5 μm or smaller from the viewpoint of enhancing the dispersibility of the crosslinking catalyst, or the like. In addition, the average particle diameter of the microparticles of the resin of (c) is preferably 0.1 μm or larger, and more preferably 2 μm or larger from the viewpoint of increasing the microparticle recovery rate at the time of producing.

The resin of (c) has a solubility parameter (SP value) of 7.9 or higher, a thermal conductivity of 0.16 W/m·K or higher, and a glasstransition temperature (Tg) of 40 to 145 degrees C. With this configuration, the silicone rubber composition can have excellent storage stability in a mixed state and excellent crosslinking reactivity during heating. The solubility parameter can be calculated based on the molecular structure by using the calculating method of small. The thermal conductivity can be measured in accordance with ASTM C177. The glasstransition temperature can be measured by DSC (differential scanning calorimetry).

Since the solubility parameter (SP value) of the resin of (c) is 7.9 or higher, which greatly deviates from the solubility parameter of silicone rubber that is a base polymer of a silicone rubber composition, the resin of (c) has lowered compatibility with the silicone rubber, which can prevent the microparticles of the resin from dissolving or swelling during storage, whereby the sustained release properties of the encapsulated crosslinking catalyst are diminished, which allows the silicone rubber composition to have improved storage stability. When having a solubility parameter of 8.3 or higher, the resin of (c) has further lowered compatibility with the silicone rubber, which allows the silicone rubber composition to have significantly improved storage stability.

Since the resin of (c) has a thermal conductivity of 0.16 W/m·K or higher, which is higher than the thermal conductivity of silicone rubber that is a base polymer of a silicone rubber composition, the resin of (c) has a higher melting rate during heating (during reaction), whereby the crosslinking catalyst has improved diffusion properties, which allows the silicone rubber composition to have improved crosslinking reactivity. When the resin of (c) has a thermal conductivity of 0.17 W/m·K or higher, or 0.20 W/m·K or higher, the silicone rubber composition has further improved crosslinking reactivity.

Since the resin of (c) has a glasstransition temperature of 145 degrees C. or lower, a difference is made between the heating temperature and the melting temperature of the resin, whereby the melting starting time of the resin during heating (during reaction) is made earlier, whereby the amount of diffusion of the crosslinking catalyst is increased, which allows the silicone rubber composition to have improved crosslinking reactivity. When the resin of (c) has a glasstransition temperature of 100 degrees C. or lower, or 85 degrees C. or lower, the melting starting time of the resin can be made earlier also in low-temperature crosslinking reaction, for example, at 120 degrees C., whereby the silicone rubber composition can have improved crosslinking reactivity by the increased amount of diffusion of the crosslinking catalyst, and thus the silicone rubber composition is excellent also in crosslinking reactivity at low temperature. However, the glasstransition temperature is made 40 degrees C. or higher in order to prevent the resin from getting softened and melted at room temperature to have the storage stability impaired. The glasstransition temperature is preferably 45 degrees C. or higher, or 50 degrees C. or higher.

The resin of (c) may be a thermoplastic resin or a thermosetting resin as long as it satisfies the above-described physical property values. Among them, the thermosetting resin is relatively preferable from the viewpoint that the compression set of the composition is not deteriorated.

Examples of the resin of (c) include an epoxy resin, an acrylic resin, a polyvinylbutyral resin, a styrene-based polymer, a silicone resin, a polycarbonate resin, a polyester resin, an unsaturated polyester resin, an alkyd resin, a urea resin, a melamine resin, a vinyl chloride resin, a polyurethane resin, a polyether sulfone resin, a polysulfone resin, a polyphenylene sulfide resin, a phenol resin, a diallyl phthalate resin, and a polyvinyl alcohol resin. Among them, a single kind of resin may be used alone, or two or more kinds of resins may be used in combination. It is preferable that the resin of (c) should not contain nitrogen compounds such as an amine and an amide, or compounds such as a phosphorous compound and a sulfuric compound in the resin composition from the viewpoint of not inhibiting the reactivity of the crosslinking catalyst. Each of the resins is made of resin materials of a same kind that have different solubility parameters and different glasstransition temperatures, so that even when any resin of a single kind among the above-described resins is used alone as the resin of (c), resin materials for the resin that have different physical property values can be combined to be adjusted so as to have predetermined physical property values. In addition, even when resins of two or more kinds among the above-described resins are used in combination as the resin of (c), resin materials for the resins that have different physical property values can be combined to be adjusted so as to have predetermined physical property values.

In the resin of (c), the acrylic resin includes both of a polymer containing an acrylate as a monomer and a polymer containing a methacrylate as a monomer. In addition, the acrylic resin includes a polymer containing an acrylate and a methacrylate as monomers. Among them, the polymer containing an acrylate and a methacrylate as monomers, and the polymer containing only a methacrylate as a monomer are preferred from the viewpoint that the solid state can be maintained at normal temperature. The acrylic resin may be a homopolymer synthesized from monomers of a single kind, or a copolymer synthesized from monomers of two or more kinds as long as the above-described physical property values are satisfied. The copolymer is preferred as the acrylic resin from the viewpoint that the glasstransition temperature can be easily adjusted to low temperatures of 100 degrees C. or lower, or 85 degrees C. or lower. Among the acrylic resins, the copolymer of an ethyl methacrylate and a methyl methacrylate is particularly preferred from the viewpoint that the glasstransition temperature can be adjusted to low temperatures of 85 degrees C. or lower.

Examples of the acrylic monomer and the methacrylic monomer include alkyl (meth)acrylates, cycloalkyl (meth) acrylates, halogenated alkyl (meth)acrylates, (meth)acrylates having a hydroxyl group, alkoxyalkyl (meth)acrylates, phenoxyalkyl (meth)acrylates, and alkoxy alkylene glycol (meth)acrylates. Specific examples thereof include alkyl (meth)acrylates such as a methyl (meth)acrylate, an ethyl (meth)acrylate, a propyl (meth)acrylate, a butyl (meth)acrylate, an isoamyl (meth)acrylate, a 2-ethylhexyl (meth)acrylate, a lauryl (meth)acrylate, and a stearyl (meth)acrylate, cycloalkyl (meth)acrylates such as a cyclohexyl (meth) acrylate, halogenated alkyl (meth)acrylates such as a chloroethyl (meth)acrylate and a chloropropyl (meth)acrylate, (meth)acrylates having a hydroxyl group such as a 2-hydroxyethyl (meth)acrylate, a 2-hydroxypropyl (meth)acrylate, a 2-hydroxybutyl (meth)acrylate, a 3-chloro-2-hydroxypropyl (meth)acrylate, and a ß-hydroxy-ß'-(meth) acryloyloxyethyl phthalate, alkoxyalkyl (meth)acrylates such as a methoxyethyl (meth)acrylate, an ethoxyethyl (meth)acrylate, and a butoxyethyl (meth)acrylate, phenoxyalkyl (meth)acrylates such as a phenoxyethyl acrylate and a nonyl phenoxyethyl (meth)acrylate, alkoxy alkylene glycol (meth)acrylates such as an ethoxy diethylene glycol (meth) acrylate, a methoxy triethylene glycol (meth)acrylate, and a methoxy dipropylene glycol (meth)acrylate, a 2,2-dimethylaminoethyl (meth)acrylate, a 2,2-diethylaminoethyl (meth)acrylate, a 2-hydroxyethyl (meth)acrylate, and a 3-chloro-2-hydroxypropyl (meth)acrylate.

In addition, specific examples of the acrylic monomer and the methacrylic monomer include alkyldiol di(meth)acrylates such as a 1,9-nonanediol di(meth)acrylate, polyethylene glycol di(meth)acrylates such as a diethylene glycol di(meth)acrylate, polypropylene glycol di(meth)acrylates such as a dipropylene glycol di(meth)acrylate, a trimethylolpropane tri(meth)acrylate, a pentaerythritol tri(meth)acrylate, a pentaerythritol tetra(meth)acrylate, a glycerol tri (meth)acrylate, polyvalent (meth)acrylates obtained by the addition reaction of a compound having an ethylenically unsaturated bond and active hydrogen such as an unsaturated carboxylic acid and an unsaturated alcohol with an ethylene glycol diglycidylether, polyvalent (meth)acrylates obtained by the addition reaction of a compound having active hydrogen such as a carboxylic acid and an amine with an unsaturated epoxy compound such as a glycidyl (meth) acrylate, polyvalent (meth)acrylamides such as a methylene bis(meth)acrylamide, and polyvalent vinyl compounds such as a divinyl benzene.

In the resin of (c), the styrene-based polymer may be a homopolymer synthesized from monomers of a single kind, or a copolymer synthesized from monomers of two or more kinds as long as the above-described physical property values are satisfied. Copolymers are preferred as the styrene-based polymer from the viewpoint that the glasstransition temperature can be easily adjusted to 0.16 W/m·K or higher. Examples of the styrene-based polymer include a styrene-maleic anhydride copolymer (SMA), a styrene-butadiene copolymer (SBS), a styrene-isoprene copolymer (SIS), a hydrogenated styrene-butadiene copolymer (SEBS), a hydrogenated styrene-isoprene copolymer (SEPS), a styrene-acrylonitrile copolymer (SAN), and an acrylonitrile-butadiene-styrene copolymer (ABS).

(c) The microcapsule type catalyst can be produced in a conventionally known method, preferably in a suspension polymerization method, an emulsion polymerization method, an in-liquid drying method, or the like from the viewpoint of productivity and sphericity.

In producing (C) the microcapsule type catalyst in the suspension polymerization method or the emulsion polymerization method, the crosslinking catalyst is dispersed as solid core substances in an organic solvent that does not dissolve the crosslinking catalyst, and the monomers are polymerized in a polymerization method including the suspension polymerization method and the emulsion polymerization method in the dispersion liquid, whereby the surfaces of the core substances are coated with polymers. The microcapsule type catalyst that is made of microparticles of a resin and the crosslinking catalyst encapsulated in the microparticles is obtained in this manner.

In producing (C) the microcapsule type catalyst in the in-liquid drying method, the crosslinking catalyst and the resin that encapsulates the crosslinking catalyst are dissolved in an organic solvent that is insoluble in water, and the resulting liquid solution is dropped into a water solution of a surface acting agent to produce an emulsion. Then, after reducing the pressure to remove the organic solvent from the emulsion, an encapsulated catalyst is obtained by filtering the emulsion.

The content of the metallic atoms of the crosslinking catalyst in (C) the microcapsule type catalyst is preferably 5% by mass or lower, and more preferably 0.8% by mass or lower from the viewpoint that the crosslinking catalyst can be sufficiently coated with the resin to secure excellent storage stability. In addition, the content is preferably 0.01% by mass or higher, and more preferably 0.3% by mass or higher from the viewpoint that the crosslinking catalyst can secure excellent catalytic activity.

Although depending on the content of the crosslinking catalyst in (C) the microcapsule type catalyst, the content of (C) the microcapsule type catalyst in the composition can be in the range of 0.01 to 5.0 parts by mass with respect to 100 parts by mass of (a) the organopolysiloxane when the content of the crosslinking catalyst in (C) the microcapsule type catalyst is within the above described predetermined range. In addition, when a metallic catalyst is used as the crosslinking catalyst, the content of (C) the microcapsule type catalyst is generally in the range of 1 ppm to 1.0 part by mass in terms of metallic amount with respect to 100 parts by mass of (a) the organopolysiloxane.

In addition to the above-described (a) to (c) materials, generally used additives such as a filler, a crosslinking accelerator, a crosslinking retarder, a crosslinking aid, an antiscorching agent, an anti-aging agent, a softening agent, a heat stabilizer, a flame retardant, a flame retardant aid, an ultraviolet absorber, a rust inhibitor, a conductive agent, and an antistatic agent may be added to the silicone rubber composition according to the present invention if necessary within range of not adversely affecting the physical properties of the present invention and the silicone rubber. Examples of the filler include reinforcing fillers such as fumed silica, crystalline silica, wet silica, and fumed titanium oxide. The silicone rubber composition according to the present embodiment of the present invention can be prepared by mixing ingredients containing the above-described (a) to (c) materials.

The silicone rubber composition according to the present embodiment of the present invention is preferably liquid at room temperature from the viewpoint of formability. For this reason, at least (a) the organopolysiloxane is preferably liquid at room temperature. In addition, both of (a) the organopolysiloxane and (b) the crosslinking agent are preferably liquid at room temperature.

Since in the silicone rubber composition according to the present embodiment of the present invention having the above-described configuration, the resin of the microparticles of the resin and the crosslinking catalyst encapsulated in the microparticles has a solubility parameter of 7.9 or higher, a thermal conductivity of 0.16 W/m·K or higher, and a glasstransition temperature of 40 to 145 degrees C., the silicone rubber composition has excellent storage stability in a mixed state and excellent crosslinking reactivity during heating. In addition, when a glasstransition temperature of the above resin is within the range of 40 to 85 degrees C., the silicone rubber composition has excellent crosslinking reactivity during low temperature heating. When the solubility parameter of the above resin is 8.3 or higher, the silicone rubber composition has improved storage stability in a mixed state.

The silicone rubber composition according to the present invention forms a silicone rubber crosslinked body by being thermally cured. The silicone rubber crosslinked body according to the present invention is made of a crosslinked product of the silicone rubber composition according to the present invention.

EXAMPLES

A detailed description of the present invention will be provided with reference to Examples.

Examples 1 to 10, Comparative Examples 1 to 4

[Preparation of Microcapsule Type Catalysts]

A toluene solution of a platinum catalyst (containing 3% by mass of platinum metallic atoms), a coating resin for microparticulation, and toluene were mixed at the ratio of 0.6:5:95 (mass ratio), and the thus-prepared solution was dropped into a water solution of a surface acting agent to prepare an emulsion. Then, the toluene was distilled and removed under reduced pressure and the emulsion was filtered to obtain microparticles for each catalyst that contain the coating resin and the platinum catalyst.

Platinum catalyst: platinum chloride (IV) manufactured by FURUYA METAL CO., LTD.

(Coating Resins)

Epoxy resin: dicyclopentadiene-type epoxy resin "HP7200H" manufactured by DIC CORPORATION Acrylic resin 1 (PMMA): "ACRYPET VH" manufactured by MITSUBISHI RAYON CO., LTD.

Acrylic resin 2 (PMMA): "ACRYPET MF" manufactured by MITSUBISHI RAYON CO., LTD.

Acrylic resin 3 (ethyl methacrylate-methyl methacrylate copolymer, EMA): "HI-PEARL M-4501" manufactured by NEGAMI CHEMICAL INDUSTRIAL CO., LTD.

Polyvinylbutyral (PVB): "MOWITAL B30HH" manufactured by KURARAY CO., LTD.

Styrene-based polymer 1 (styrene-butadiene copolymer, SBS): K-RESIN (KR03) manufactured by DAELIM INDUSTRIAL CO., LTD.

Styrene-based polymer 2 (styrene-maleic anhydride copolymer, SMA): "SMA1000 RESIN" manufactured by KAWAHARA PETROCHEMICAL CO., LTD.

Polycarbonate resin 1 (PC1): "IUPILON H-300" manufactured by MITSUBISHI GAS CHEMICAL COMPANY, INC.

Silicone resin 1 (methyl silicone resin, methyl Q): "YR3370" manufactured by MOMENTIVE PERFORMANCE MATERIALS JAPAN LLC Silicone resin 2 (phenyl silicone resin, phenyl Q): "BELSIL SPR 45 VP" manufactured by WACKER ASAHIKASEI SILICONE CO., LTD.

Hydrogenated terpene resin: "CLEARON P150" manufactured by YASUHARA CHEMICAL CO., LTD.

Polycarbonate resin 2 (PC2): "IUPIZETA PCZ200" manufactured by MITSUBISHI GAS CHEMICAL COMPANY, INC.

Styrene-based polymer 3 (styrene-maleic anhydride copolymer, SMA): "SMA2000 RESIN" manufactured by KAWAHARA PETROCHEMICAL CO., LTD.

Styrene-based polymer 4 (polystyrene, PS): "TOYO STYRENE GPPS HRM 12" manufactured by TOYO STYRENE CO., LTD.

Surface acting agent: "Triton X-100" manufactured by WAKO PURE CHEMICAL INDUSTRIES, LTD.

[Preparation of Silicone Rubber Compositions]

Examples 1 to 10, Comparative Examples 1 to 4

100 parts by mass of (a) the organopolysiloxane and 0.42 parts by mass of (c) the microcapsule type catalyst were mixed to be blended with the use of a planetary mixer for 30 minutes. Then, 2.69 parts by mass of (b) the crosslinking agent, 20 parts by mass of a reinforcing agent, and 0.01 parts by mass of a retarder were added to the mixture to be blended for another 30 minutes, and the mixture was vacuum degassed. Thus, each addition curing type silicone rubber composition in the form of a liquid was prepared.

(a) The organopolysiloxane: liquid silicone rubber ("DMS-V35" manufactured by GELEST, INC., a vinyl group-containing dimethylpolysiloxane)

(b) The crosslinking agent: a hydrosilylation crosslinking agent ("HMS-151" manufactured by GELEST, INC., a hydrosilyl group-containing dimethylpolysiloxane)

(c) Each of the microcapsule type catalysts

The reinforcing agent: fumed silica, "AEROSIL RX50" manufactured by NIPPON AEROSIL The retarder: acetylene alcohol, "1-ETHYNYL-1-CYCLOHEXANOL" manufactured by TOKYO CHEMICAL INDUSTRY CO., LTD.

The resulting silicone rubber compositions were evaluated in terms of crosslinking reactivity and storage stability. The results are shown in Table 1. It is to be noted that the solubility parameters (SP values), the glasstransition temperatures (Tg), and the thermal conductivities of the coating resins of the microcapsule type catalysts were measured in the following methods.

(Solubility Parameters (SP Values))

The SP values of the coating resins of the silicone rubber compositions were estimated based on the molecular structures by using the calculating method of small.

Equation: $\delta = \rho \Sigma F_i / M$ ($\delta$: a compatibility parameter, [$\rho$: a resin specific gravity, M: a molecular mass of a resin structural unit, Fi: a molar attraction constant)

(Glasstransition Temperatures (Tg))

The temperatures at the endothermic peaks indicating the glass transition points of the resins of the silicone rubber compositions were measured by a DSC (differential scanning calorimetry) measurement. The DSC measurements were performed under a nitrogen gas atmosphere at the rate of temperature increase of 20 degrees C./min.

(Thermal Conductivities)

The thermal conductivities of the coating resins of the silicone rubber compositions were measured with the use of a thermal conductivity meter "QTM-3" manufactured by KYOTO ELECTRONICS MANUFACTURING CO., LTD. in accordance with ASTM C177.

(Crosslinking Reactivity)

The crosslinking reactivity of the silicone rubber compositions at 170 degrees C. and 120 degrees C. was measured with the use of a curelastometer. In these measurements, the times that take the torques to reach the maximum of 90% were measured as crosslinking times. The silicone rubber compositions having crosslinking times within 40 seconds at the high temperature (170 degrees C.) were rated "good", and the silicone rubber compositions having crosslinking times within 40 seconds at the low temperature (120 degrees C.) were rated "very good". The silicone rubber compositions having crosslinking times over 40 seconds at the high temperature (170 degrees C.) were rated "poor".

(Storage Stability)

After the silicone rubber compositions were prepared, the viscosities of the silicone rubber compositions after having been left for one week at room temperature and normal humidity were measured (a viscometer: a model TVB-10 viscometer manufactured by TOKI SANGYO CO., LTD.). The silicone rubber compositions that had a viscosity increase rate of 50% or lower were rated "good", the silicone rubber compositions that had a viscosity increase rate of 30% or lower were rated "very good", and the silicone rubber compositions that had a viscosity increase rate of higher than 50% and were cured were rated "poor".

TABLE 1

| | Resin of resin microparticulate catalyst | | | | Evaluation | |
| --- | --- | --- | --- | --- | --- | --- |
| | Kind of resin | SP value ($\delta$) | Tg (° C.) | Thermal conductivity (W/mK) | Cross-linking time T90 (sec.) | Storage stability |
| Example 1 | Epoxy resin | 8.7 | 41 | 0.30 | Very good | Very good |
| Example 2 | Acrylic resin 1 (PMMA) | 9.3 | 116.8 | 0.20 | Good | Very good |
| Example 3 | Acrylic resin 2 (PMMA) | 9.3 | 96 | 0.20 | Good | Very good |
| Example 4 | Acrylic resin 3 (EMA) | 9.6 | 84 | 0.20 | Very good | Very good |
| Example 5 | PVB | 8.8 | 59 | 1.20 | Very good | Very good |
| Example 6 | Styrene-based polymer 1 (SBS) | 8.9 | 85 | 0.18 | Very good | Very good |
| Example 7 | Styrene-based polymer 2 (SMA) | 8.8 | 135 | 0.18 | Good | Very good |
| Example 8 | Polycarbonate resin 1 | 9.7 | 145 | 0.24 | Good | Very good |
| Example 9 | Silicone resin 1 (methyl Q) | 7.9 | 77 | 0.17 | Very good | Very good |
| Example 10 | Silicone resin 2 (phenyl Q) | 8.3 | 85 | 0.17 | Very good | Very good |
| Comparative Example 1 | Hydrogenated terpene resin | 7.6 | 150 | 0.40 | — | Poor |

TABLE 1-continued

| | Resin of resin microparticulate catalyst | | | | Evaluation | |
|---|---|---|---|---|---|---|
| | Kind of resin | SP value (δ) | Tg (° C.) | Thermal conductivity (W/mK) | Cross-linking time T90 (sec.) | Storage stability |
| Comparative Example 2 | Polycarbonate resin 2 | 9.7 | 174 | 0.24 | Poor | Very good |
| Comparative Example 3 | Styrene-based polymer 3 (SMA) | 8.8 | 155 | 0.18 | Poor | Very good |
| Comparative Example 4 | Styrene-based polymer 4 (PS) | 8.9 | 100 | 0.14 | Poor | Very good |

In the silicone rubber composition according to Comparative Example 1, the resin of the microcapsule type catalyst has an SP value of lower than 7.9, and is thus inferior in storage stability. This is because since immediately after the microcapsule type catalyst was blended with the mixture of the organopolysiloxane and the crosslinking agent, the mixture proceeded to be cured, and the crosslinking reactivity could not be evaluated. In the silicone rubber compositions according to Comparative Examples 2 and 3, the resins of the microcapsule type catalysts have glasstransition temperatures (Tg) that are too high, and are thus inferior in crosslinking reactivity. In the silicone rubber composition according to Comparative Example 4, the resin of the microcapsule type catalyst has a low thermal conductivity, and is thus inferior in crosslinking reactivity. In contrast, it is found that since in the silicone rubber compositions according to the present examples, the resins of the microcapsule type catalysts have SP values of 7.9 or higher, glasstransition temperatures (Tg) of 145 degrees C. or lower, and thermal conductivities of 0.16 (W/m·K) or higher, the compositions are excellent in storage stability and crosslinking reactivity. It is found from comparison between the silicone rubber composition according to Example 9 and the silicone rubber compositions according to the other present examples, that when the resins of the microcapsule type catalysts have SP values of 8.3 or higher, the compositions are more excellent in storage stability. In addition, it is found from comparison between the silicone rubber compositions according to Examples 2, 3, 7 and 8, and the silicone rubber compositions according to the other present examples, that when the resins of the microcapsule type catalysts have glasstransition temperatures (Tg) of 85 degrees C. or lower, the compositions are more excellent in in crosslinking reactivity. In addition, it is found from the silicone rubber compositions according to Examples 2 to 4 that when the acrylic resin is a copolymer, the resin of the microcapsule type catalyst has a reduced glasstransition temperature (Tg), and the composition thus has improved crosslinking reactivity. In addition, it is found from the silicone rubber compositions according to Example 6 and Comparative Example 4 that when the styrene-based polymer is a copolymer, the resin of the microcapsule type catalyst has an improved thermal conductivity, and the composition thus has improved crosslinking reactivity.

While the embodiments and examples of the present invention have been described in detail, the present invention is not limited to the above-described embodiments and examples, and various modifications can be made without departing from the gist of the present invention.

The invention claimed is:

1. A silicone rubber composition comprising:
(a) an organopolysiloxane;
(b) a crosslinking agent; and
(c) a microcapsule type catalyst that comprises microparticles of a resin and a crosslinking catalyst encapsulated in the microparticles,
wherein the resin of (c) has a solubility parameter of 7.9 or higher, a thermal conductivity of 0.16 W/m·K or higher, and a glass transition temperature of 40 to 145 degrees C.,
wherein the resin of (c) comprises at least one of an epoxy resin, an acrylic resin, a polyvinylbutyral resin, and a styrene based polymer,
wherein the acrylic resin comprises a copolymer of ethyl methacrylate and methyl methacrylate, and the styrene based polymer comprises any one of a copolymer of styrene and butadiene, a copolymer of styrene and maleic anhydride, a copolymer of styrene and isoprene, a hydrogenated styrene-butadiene copolymer, and a hydrogenated styrene-isoprene copolymer.

2. The silicone rubber composition according to claim 1, wherein the glass transition temperature of the resin of (c) is within the range of 40 to 85 degrees C.

3. The silicone rubber composition according to claim 2, wherein the solubility parameter of the resin of (c) is 8.3 or higher.

4. The silicone rubber composition according to claim 3, wherein the thermal conductivity of the resin of (c) is 0.20 W/m·K or higher.

5. The silicone rubber composition according to claim 4, wherein the glass transition temperature of the resin of (c) is 50 degrees C. or higher.

6. The silicone rubber composition according to claim 5, wherein the resin of (c) comprises the polyvinylbutyral resin.

7. A silicone rubber crosslinked body that comprises a crosslinked product of the silicone rubber composition according to claim 6.

8. The silicone rubber composition according to claim 6, wherein the microparticles of (c) have an average particle diameter of 0.1 μm or larger and 30 μm or smaller.

9. A silicone rubber crosslinked body that comprises a crosslinked product of the silicone rubber composition according to claim 8.

10. The silicone rubber composition according to claim 3, wherein the glass transition temperature of the resin of (c) is 50 degrees C. or higher.

11. The silicone rubber composition according to claim 10, wherein the resin of (c) comprises the polyvinylbutyral resin.

12. A silicone rubber crosslinked body that comprises a crosslinked product of the silicone rubber composition according to claim 1.

* * * * *